United States Patent Office
3,511,892
Patented May 12, 1970

3,511,892
3((AMINO-ALKYL AND AMINO-ARYL)CARBAMO-YL)-4-HYDROXY-COUMARINS
John S. McIntyre, Jr., Sarnia, Ontario, and Allan R. Knight, Petrolia, Ontario, Canada, assignors to Dow Chemical Company, Midland, Mich., a corporation of Delaware
No Drawing. Filed June 24, 1968, Ser. No. 739,199
Int. Cl. C07d 7/28; A01n 9/28
U.S. Cl. 260—343.2
6 Claims

ABSTRACT OF THE DISCLOSURE

The present disclosure is directed to 3((amino-alkyl and amino-aryl)carbamoyl)-4-hydroxycoumarins and to the corresponding unsubstituted hydrazide compound, their preparation as well as their utility as bactericides and fungicides.

SUMMARY OF THE INVENTION

The present invention relates to a novel and useful group of substituted 3-carbamoyl-4-hydroxycoumarins. It is more particularly concerned with a new series of 3((amino - alkyl and amino-aryl)carbamoyl)-4-hydroxy-coumarins. This series of compounds can be represented by the Formula I:

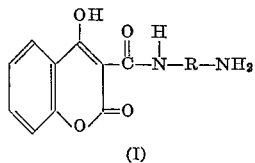

(I)

In this and succeeding formulas, R represents alkylene groups of 2 to 4 carbon atoms and phenylene.

The compound 4-hydroxy-2-oxo-2H-benzopyran-3-carboxylic acid hydrazide contains no R substitution and is represented by the Formula II:

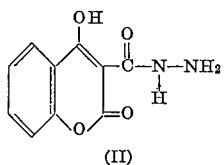

(II)

The compounds of the present invention are crystalline or powdery solids and are useful as bactericides and fungicides for the control of a wide variety of organisms such as *Staphylococcus aureus*, *Bacillus substilis*, *Mycobacterium phlei*, *Salmonella typhosa*, *Aerobacter aerogenes*, *Escherichia coli*, *Trichophyton mentagrophytes*, *Pullularia pullulans* and *Cundida alpicans* and other fungal organisms such as downey mildew and tomato late blight.

Representative 3-carbamoyl-4-hydroxycoumarins of this invention include:

4-hydroxy-2-oxo-2H-1-benzopyran-3-carboxylic acid hydrazide,
3-((2-aminoethyl)carbamoyl)-4-hydroxycoumarin,
3-((3-aminopropyl)carbamoyl)-4-hydroxycoumarin,
3-((4-aminobutyl)carbamoyl)-4-hydroxycoumarin, and
3-((p-aminophenyl)carbamoyl)-4-hydroxycoumarin.

The 4 - hydroxy-2-oxo-2-H-1-benzopyran-3-carboxylic acid hydrazide of the invention is prepared by the reaction of 3-carboethoxy-4-hydroxycoumarin and hydrazine in a solvent such as methanol under reflux conditions. Inert solvents such as acetone, ethanol, isopropanol and other alcoholic solvents can be employed. The amount of the reactants to be employed is not critical, some of the product being formed when employing any proportions.

The reaction consumes the reactants, however, in the ratio of one mole of the 3-carboethoxy-4-hydroxycoumarin per mole of hydrazine, and the employment of such proportions is preferred.

In carrying out this reaction, the 3-carboethoxy-4-hydroxycoumarin, hydrazine and methanol are contacted and maintained together in any convenient fashion. The reaction is allowed to proceed and the temperature is maintained at the reflux temperature of the reaction mixture. The pressure is not critical and is usually maintained at ambient atmospheric pressure. The reaction is allowed to proceed to completion with the formation of a solid product, usually within about 20 minutes. The solid product is filtered from the reaction mixture and then washed with methanol.

This product is then, with or without the methanol washing step, mixed with nitrobenzene and heated to a temperature between 130 and 170° C. until gas evolution has ceased, usually in about 15 minutes. The mixture is then cooled and the solid which precipitates is recovered and washed with methanol.

The 3-((aminoalkyl and aminoaryl)carbamoyl)-4- hydroxycoumarins are prepared by the condensation of 3-carboethoxy-4-hydroxycoumarin with the appropriate substituted diamine in a solvent such as nitrobenzene. Representative diamines are ethylenediamine, trimethylenediamine, propylenediamine, 2,3-butylenediamine, tetramethylenediamine, and ortho-, meta-, and para-phenylenediamine. The amounts of the reactants to be employed are not critical, some of the desired product being formed when the reactants are employed in any proportions. The reaction consumes the reactants in the ratio of one mole of the 3-carboethoxy-4-hydroxycoumarin per mole of the diamine and the employment of at least one mole of the diamine per mole of the substituted coumarin is preferred. The reactants and solvent are contacted and maintained together in any convenient fashion. The reaction mixture is heated and the reaction is allowed to proceed at a temperature maintained between 140° and 150° C. at ambient atmospheric pressure, with stirring, until completion and a solid product is formed. The reaction mass is cooled and the solid product recovered by filtration or any other conventional separation procedure. The product is then washed in methanol. The use of higher reaction temperatures should be avoided as charring and discoloration of the product may occur.

DESCRIPTION OF SOME PREFERRED EMBODIMENTS

The following examples illustrate the present invention and the manner by which it can be practiced but, as such, should not be construed as limitations upon the overall scope of the same.

EXAMPLE 1

4-hydroxy-2-oxo-2H-1-benzopyran-3-carboxylic acid hydrazine 5.0 grams (.021 mole) of 3-carboethoxy-4-hydroxycoumarin and 3.0 grams (.09 mole) of hydrazine were mixed with 25 milliliters of methanol. This mixture was heated at atmospheric pressure to the reflux temperature of the mixture and maintained at this temperature for 20 minutes until a solid product was formed. The reaction mixture was cooled and filtered to recover 5.0 grams (93 percent) of the hydrazine salt of 4-hydroxy-2-oxo-2H-1-benzopyran-3-carboxylic acid hydrazine. This product was a white powder decomposing at 188° C. 2.0 grams of the hydrazine salt of 4-hydroxy-2-oxo-2H-1-benzopyran-3-carboxylic acid hydrazine was mixed with 15 milliliters of nitrobenzene. This mixture was heated to a temperature of 150° C. and a gas basic to litmus was evolved. When the gas evolution ceased, the mixture was cooled and a precipitate formed. The 4-hydroxy-2-oxo-2H-1-benzopyran-3-carboxylic acid hydrazine product was separated by filtration and washed with methanol. The product was obtained in a yield of 1.5 grams (85 percent) and was a white powder having a melting point of 175° C., a molecular weight of 220, and was found by analysis to have carbon, hydrogen and nitrogen contents of 54.81, 3.65 and 12.36 percent, respectively, as compared with the theoretical contents of 54.54, 3.64 and 12.73 percent, respectively, calculated for the named structure.

EXAMPLE 2

3-((3-aminopropyl)carbamoyl)-4-hydroxycoumarin 10.0 grams (0.043 mole) of 3-carboethoxy-4-hydroxycoumarin were mixed with 20 milliliters of nitrobenzene. To this mixture 3.2 grams (0.043 mole) of trimethylenediamine was added with stirring. The reaction mixture was heated to and maintained at a temperature of 140°–150° C., at ambient atmospheric pressure for one hour, with agitation, until the reaction was completed and a solid product was formed. The reaction mixture was cooled and the solids separated by filtration and the 3-((3-aminopropyl)carbamoyl) - 4 - hydroxycoumarin product was washed with methanol and dried. The product was obtained in a yield of 10.0 grams (88 percent), was a white powder, had a melting point of 243°–244° C. and a molecular weight of 262. The product was found by analysis to have carbon, hydrogen and nitrogen contents of 59.16, 5.55 and 10.82 percent, respectively, as compared with the theoretical contents of 59.54, 5.34 and 10.69 percent, respectively, calculated for the named structure.

In a similar manner, other compounds of the invention having the indicated properties are prepared as follows:

3-((2-aminoethyl)carbamoyl)-4-hydroxycoumarin in a yield of 93 percent by reacting 3-carboethoxy-4-hydroxycoumarin with ethylenediamine in nitrobenzene. Off white powder; molecular weight of 248; melting point 255°–256° C.

Elemental analysis.—Calculated for $C_{12}H_{12}N_2O_4$ (percent): C, 58.06; H, 4.84; N, 11.29. Found by analysis (percent): C, 57.76; H, 4.78; N, 11.49.

3 - ((2 - aminopropyl)carbamoyl)-4-hydroxycoumarin having a molecular weight of 262 by reacting 3-carboethoxy-4-hydroxycoumarin with propylenediamine in nitrobenzene.

3-((4-aminobutyl)carbamoyl)-4-hydroxycoumarin in a yield of 85 percent by reacting 3-carboethoxy-4-hydroxycoumarin with tetramethylenediamine in nitrobenzene. Off white powder; molecular weight of 276; melting point 246°–247° C.

Elemental analysis.—Calculated for $C_{14}H_{16}N_2O_4$ (percent): C, 60.86; H, 5.80; N, 10.14. Found (percent): C, 60.68; H, 5.76; N, 10.20.

3 - ((p - aminophenyl)carbamoyl)-4-hydroxycoumarin in a yield of 76 percent by reacting 3-carboethoxy-4-hydroxycourmarin and p-phenylenediamine in nitrobenzene. Yellow powder; molecular weight of 296; melting point 330° C. with decomposition.

Elemental analysis.—Calculated for $C_{16}H_{12}N_2O_4$ (percent): C, 64.86; H, 4.05; N, 9.50. Found (percent): C, 64.82; H, 4.17; N, 9.30.

The compounds of the invention are employed as toxicants in bactericides and fungicides. For such uses, the compounds can be employed in an unmodified form or dispersed on a finely divided solid and employed as dusts. Such mixtures can also be dispersed in water with or without the aid of a surface-active agent and the resulting aqueous suspension employed as sprays. In other procedures, the products can be employed as active constituents in solvent solutions, oil-in-water or water-in-oil emulsions or aqueous dispersions. The augmented compositions are adapted to be formulated as concentrates and subsequently diluted with additional liquid or solid adjuvants to produce the ultimate treating compositions. Good results are obtained when employing compositions containing bactericidal and fungicidal concentrations and usually from about 1 to 10,000 parts by weight of one or more of the compounds per million parts of such composition.

In a representative operation, the compounds of the present invention were tested for their activity in the control of bacterial and fungal organisms. Separate suspensions of each compound were prepared by adding the compound to isopropanol and then diluting each individual mixture to a concentration of about 500 parts by weight of active compound per million parts of warm melted nutrient agar. The resultant treated nutrient was poured into petri dishes and allowed to solidify. A compound of the invention was the sole toxicant in any one treated nutrient. Check dishes were also prepared from the nutrient agar containing none of the toxicant. Droplets of representative organism cultures were applied to the agar surface in each petri dish. The inoculated nutrient agar cultures were then incubated for about 48 hours under conditions conducive to growth of the test organisms. In such operation, 4-hydroxy-2-oxo-2H-1-benzopyran-3-carboxylic acid hydrazide was found to give 100 percent kill and control of *Bacillus subtilis* and *Mycobacterium phlei*. 3-((2-aminoethyl)carbamoyl) - 4 - hydroxycoumarin was found to give 100 percent kill and control of *Mycobacterium phlei*, *Escherichia coli*, *Aerobacter aerogenes*, *Staphylococcus aureus*, *Bacillus subtilis*, *Trichophyton mentagrophytes* and *Salmonella typhosa*. In similar operations, 3-((3-aminopropyl)carbamoyl) - 4 - hydroxycoumarin was found to give 100 percent kill and control of *Bacillus subtilis*, *Salmonella typhosa* and *Mycobacterium phlei*. In further representative operations, 3-((4-aminobutyl)carbamoyl)-4-hydroxycoumarin was found to give 100 percent kill and control of *Bacillus subtilis* and *Mycobacterium phlei* and 3-(p-aminophenyl)-carbamoyl)-4-hydroxycoumarin was found to give 100 percent kill and control of *Bacillus subtilis*, *Mycobacterium phlei*, *Salmonella typhosa*, *Rhizopus nigricans*, *Staphylococcus aureus*, *Pullularia pullulans*, *Trichophyton mentagrophytes* and *Candida albicans*. In each of the above determinations, the check nutrient agar supported a heavy growth of the test organisms.

In another representative operation, an aqueous suspension of 3-((2-aminoethyl)carbamoyl)-4-hydroxy-coumarin was prepared containing about 600 parts of the compound, as the sole toxicant, per million parts by weight of ultimate suspension, by mixing the compound with a small amount of acetone and a wetting agent and diluting the mixture with water until the above concentration was reached. Individual host plants were thoroughly wetted with the suspension and thereafter inoculated with the fungal pathogens, tomato late blight and downey mildew. Check plants which had not been treated with a toxicant were also inoculated with the same pathogens. The plants were maintained under conditions conducive to growth of the disease until the disease symptoms were well developed on the check plants. In such operation, the toxicant was found to give 100 percent kill and control of the test pathogens on the treated plants.

PREPARATION OF STARTING MATERIALS

The 3-carboethoxy-4-hydroxycoumarin may be prepared by the reaction of diethylmalonate and acetylsalicylyl chloride in ice water to maintain the temperature between 5° and 10° C. and in the presence of sufficient 50 percent sodium hydroxide to maintain the pH of the mixture at 11. Water-insoluble material is then separated and sodium hydroxide is added to the remaining solution. A solid product is then separated and then boiled in water, acidified and cooled. This preparation is further described in U.S. Pat. 2,449,038.

What is claimed is:
1. The compound corresponding to the formula

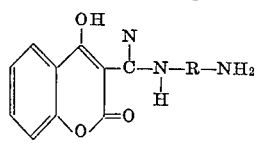

wherein R represents alkylene groups of 2 to 4 carbon atoms and phenylene.

2. The compound of claim 1 wherein the compound is 3-((2-aminoethyl)carbamoyl)-4-hydroxycoumarin.

3. The compound of claim 1 wherein the compound is 3-(aminopropyl)carbamoyl)-4-hydroxycoumarin.

4. The compound of claim 1 wherein the compound is 3-((4-aminobutyl)carbamoyl)-4-hydroxycoumarin.

5. The compound of claim 1 wherein the compound is 3-((p-aminophenyl)carbamoyl)-4-hydroxycoumarin.

6. 4-hydroxy - 2 - oxo-2H-1-benzopyrancarboxylic acid hydrazide.

References Cited
UNITED STATES PATENTS

| | | | |
|---|---|---|---|
| 3,122,557 | 2/1964 | Molho | 260—343.2 XR |
| 3,293,255 | 12/1966 | Molho et al. | 260—343.2 XR |

HENRY R. JILES, Primary Examiner

J. M. FORD, Assistant Examiner

U.S. Cl. X.R.
424—281

PO-1050
(5/69)

UNITED STATES PATENT OFFICE
CERTIFICATE OF CORRECTION

Patent No. 3,511,892      Dated May 12, 1970

Inventor(s) John S. McIntyre, Jr. & Allan R. Knight

It is certified that error appears in the above-identified patent and that said Letters Patent are hereby corrected as shown below:

In Col. 5, the formula in Claim 1 should be deleted and and replaced with the following:

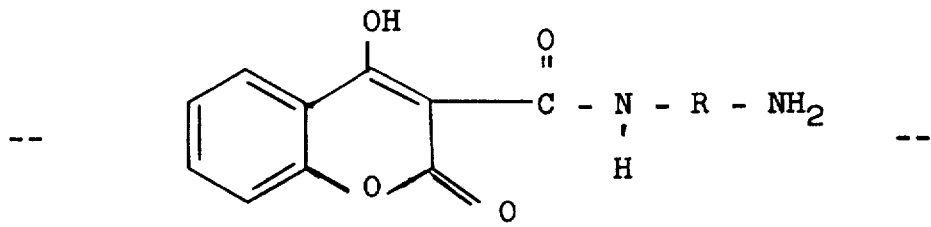

In Col. 5, line 14, delete "3-(aminopropyl)" and insert in its place --3-((3-aminopropyl)--.

SIGNED AND
SEALED
SEP 29 1970

(SEAL)
Attest:

Edward M. Fletcher, Jr.
Attesting Officer

WILLIAM E. SCHUYLER, JR.
Commissioner of Patents